(12) United States Patent
Genkin et al.

(10) Patent No.: US 8,245,201 B2
(45) Date of Patent: *Aug. 14, 2012

(54) METHOD AND SYSTEM FOR RECORDING AND REPLAYING SERVICE INTERACTIONS

(75) Inventors: Mikhail B. Genkin, North York (CA); Michael Starkey, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 1725 days.

This patent is subject to a terminal disclaimer.

(21) Appl. No.: 10/835,777

(22) Filed: Apr. 30, 2004

(65) Prior Publication Data

US 2005/0246153 A1 Nov. 3, 2005

(51) Int. Cl.
G06F 9/44 (2006.01)

(52) U.S. Cl. .................. 717/134; 717/126; 717/136

(58) Field of Classification Search .......... 717/134, 717/135

See application file for complete search history.

(56) References Cited

U.S. PATENT DOCUMENTS

| | | | | |
|---|---|---|---|---|
| 6,061,511 A * | 5/2000 | Marantz et al. | ................. | 703/28 |
| 6,125,442 A | 9/2000 | Maves et al. | | |
| 6,167,365 A * | 12/2000 | Karthikeyan et al. | ........... | 703/28 |
| 6,195,765 B1 * | 2/2001 | Kislanko et al. | ............. | 714/38.1 |
| 6,549,216 B1 * | 4/2003 | Schumacher et al. | ........ | 715/704 |
| 6,631,345 B1 * | 10/2003 | Schumacher et al. | .......... | 703/22 |
| 6,738,813 B1 * | 5/2004 | Reichman | ..................... | 709/224 |
| 6,775,826 B1 * | 8/2004 | Zahavi et al. | .................. | 717/128 |
| 6,832,367 B1 * | 12/2004 | Choi et al. | ................... | 717/130 |
| 7,013,251 B1 * | 3/2006 | Nace et al. | ....................... | 703/13 |
| 7,043,546 B2 * | 5/2006 | Smith et al. | ................... | 709/224 |
| 2002/0052728 A1 * | 5/2002 | Yutaka | ............................. | 703/26 |
| 2002/0143931 A1 * | 10/2002 | Smith et al. | ................... | 709/224 |
| 2002/0184646 A1 * | 12/2002 | Lord | ............................. | 725/109 |
| 2003/0037023 A1 * | 2/2003 | Lyakovetsky et al. | ............ | 707/1 |
| 2003/0172198 A1 * | 9/2003 | Tiwary et al. | ..................... | 710/1 |
| 2003/0225566 A1 * | 12/2003 | O'Brein et al. | .................. | 703/24 |
| 2004/0034852 A1 * | 2/2004 | Nakashima | ................... | 717/161 |
| 2004/0088602 A1 * | 5/2004 | Cohen et al. | ..................... | 714/38 |
| 2004/0205174 A1 * | 10/2004 | Snyder et al. | ................. | 709/223 |
| 2004/0243338 A1 * | 12/2004 | Sabiers et al. | ................ | 702/122 |
| 2005/0166094 A1 * | 7/2005 | Blackwell et al. | .............. | 714/38 |

FOREIGN PATENT DOCUMENTS

| | | |
|---|---|---|
| EP | 0594888 A1 | 5/1994 |
| WO | WO 01/28219 | 4/2001 |
| WO | WO 03/032125 A2 | 4/2003 |

OTHER PUBLICATIONS

Visual Studio Enterprise Tools, Section 6: Going Live: Instrumentation, Testing, and Deployment. Travis, Brian, Nov. 2003, pp. 1-27, retrieved on the internet from <http://msdn2.microsoft.com/en-us/library/aa302167.aspx> on Jun. 18, 2007.*

* cited by examiner

Primary Examiner — Isaac Tecklu

(74) Attorney, Agent, or Firm — Steven M. Greenberg, Esq.; Carey, Rodriguez, Greenberg & O'Keefe

(57) ABSTRACT

Recording and replaying service interactions permits developers to evaluate, iteratively build and test middle-tier and other software components using realistic interaction data and quality of service (QoS) characteristics without requiring constant access to a resource operating in a production environment. Typical service execution sequences can be recorded once by the system administrator/deployer, then replayed as many times as necessary by developers iteratively building and testing middle-tier components.

12 Claims, 8 Drawing Sheets

METHOD AND SYSTEM FOR RECORDING AND REPLAYING SERVICE INTERACTIONS

BACKGROUND OF THE INVENTION

The invention relates to development and testing of computer software, and in particular, middle-tier components in a services-oriented environment.

During development of business-to-business (B2B) applications and enterprise information (EI) applications, unit testing and debugging middle-tier components may be performed. In a services-oriented environment, processing capabilities are exposed as services accessible to others, for example, via a network such has the Internet. Middle-tier components in such an environment are used to represent the services and processes. Services often access remote resources to provide the desired processing capability. These remote resources may comprise Enterprise Information Systems (EIS) among other resources. Some typical examples of EIS are CICS™ and IMS™ from International Business Machines Corporation, SAP™ from SAP AS and PeopleSoft™ from Peoplesoft, Inc.

Often these EIS comprise applications that are currently operating in an existing production environment for a business, for example, to provide transaction processing. To preserve integrity and maintain production, these live applications typically cannot be interrupted during the development process such as when the EIS are developed to be exposed as services. Similarly, other types of resources to be accessed by a given service—a remote Enterprise Java Bean™ (EJB) for example, often cannot be disturbed for development. (Java and all Java-related marks are trademarks of Sun Microsystems, Inc.)

During the lifecycle of a service-oriented application, the application will usually go through the following phases: initial creation; unit testing; integration testing; deployment; monitoring and problem/determination in the production environment; iterative development to fix problems, and subsequent re-deployment. During the iterative development phase for performing bug fixes, performance tuning, architectural changes to the application, etc. developers need to work in a development/testing environment which very closely resembles the production environment.

BRIEF SUMMARY OF THE INVENTION

In accordance with one aspect of the present invention, a method of evaluating a software component defined to interact with a resource residing in a production environment includes emulating an interaction with the resource in a development environment from interaction data obtained from a corresponding interaction with the resource in the production environment and evaluating the software component.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
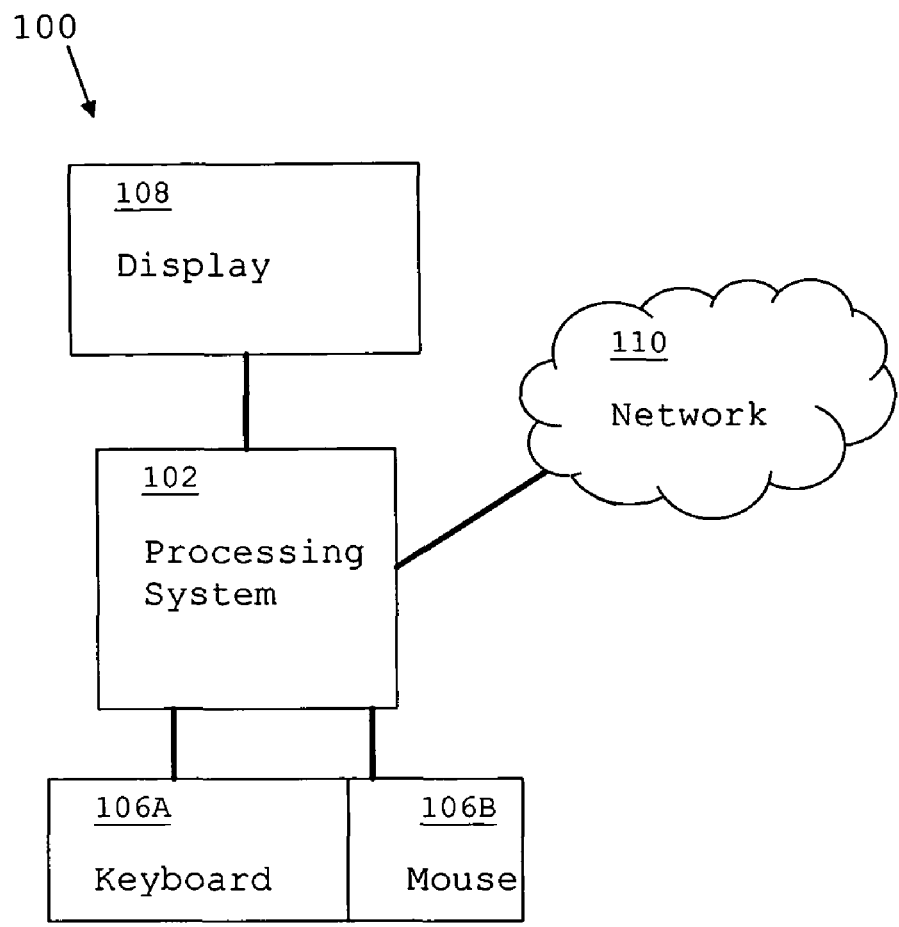
FIG. 1 schematically illustrates a computer embodying aspects of the invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the users computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

An embodiment of the invention, computer system 100, is illustrated in FIG. 1. Computer system 100, which is illustrated for exemplary purposes as a single computing device, is adapted to communicate with other computing devices (not shown) using network 10. As will be appreciated by those of ordinary skill in the art, network 110 may be embodied using conventional networking technologies and may include one or more of the following: local networks, wide area networks, intranets, the Internet, and the like.

Through the description herein, an embodiment of the invention is illustrated with aspects of the invention embodied solely on computer system 100. As will be appreciated by those of ordinary skill in the art, aspects of the invention may be distributed among one or more networked computing devices which interact with computer system 100, using one or more networks such as, for example network 110. However, for ease of understanding, aspects of the invention have been described as being embodied in a single computing device—computer system 100.

Computer system 100 may include a processing system 102 which is enabled to communicate with the network 110, various input devices 106, and output devices 108. Input devices 106, (a keyboard and a mouse are shown) may also include a scanner, an imaging system (e.g., a camera, etc.), or the like. Similarly, output devices 108 (only a display is illustrated) may also include printers and the like. Additionally, combination input/output (I/O) devices may also be in communication with processing system 102. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
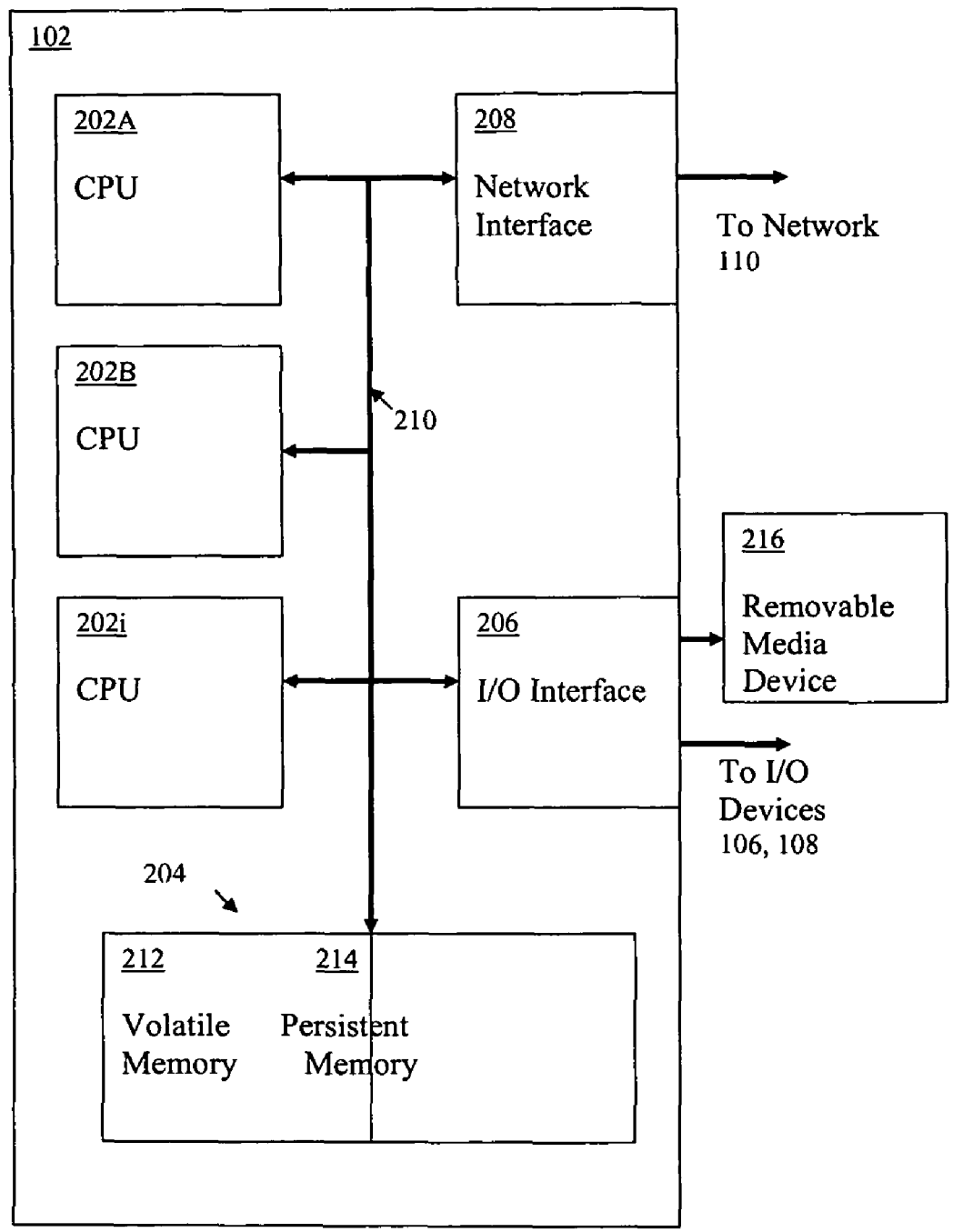
FIG. 2 schematically illustrates in greater detail a portion of the computer of FIG. 1.

An exemplary processing system 102 is illustrated in greater detail in FIG. 2. As illustrated, the processing system 102 includes a number of components: a plurality of central processing units (CPUs) 202A, 202B, . . . 202i, collectively 202; memory 204; network interface (I/F) 208; and input-output (I/O) interface 206. Communication between various components of the processing system 102 may be facilitated via a suitable communications bus 210 as required.

Each CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of the processing system 102 could use alternative CPUs and may include embodiments in which one CPU is employed (not shown). CPUs 202 may include various support circuits to enable communication between CPUs 202 and the other components of processing system 102.

Memory 204 may include both volatile memory 212 and persistent memory 214 for the storage of: operational instructions for execution by CPUs 202; data registers; application and thread storage; and the like. Memory 204 preferably includes a combination of random access memory (RAM), read only memory (ROM), and persistent memory such as that provided by a hard disk drive.

Network I/F 208 enables communication between other computing devices (not shown) and other network computing devices via network 110. Network I/F 208 may be embodied in one or more conventional communication devices. Examples of a conventional communication device include: an Ethernet card; a token ring card; a modem, or the like. Network I/F 208 may also enable the retrieval or transmission of instructions for execution by CPUs 202, from or to a remote storage media or device via network 110.

I/O interface 206 enables communication between processing system 102 and the various I/O devices 106 and 108. I/O interface 206 may include, for example a video card for interfacing with an external display such as output device 108. Additionally, I/O interface 206 may enable communication between processing system 102 and a removable media device 216. Removable media 216 may comprise a conventional diskette or other removable memory devices such as Zip™ drives, flash cards, CD-ROMs, static memory devices, and the like. Removable media 216 may be used to provide instructions for execution by CPUs 202 or as a removable data storage device.

Figure 3:
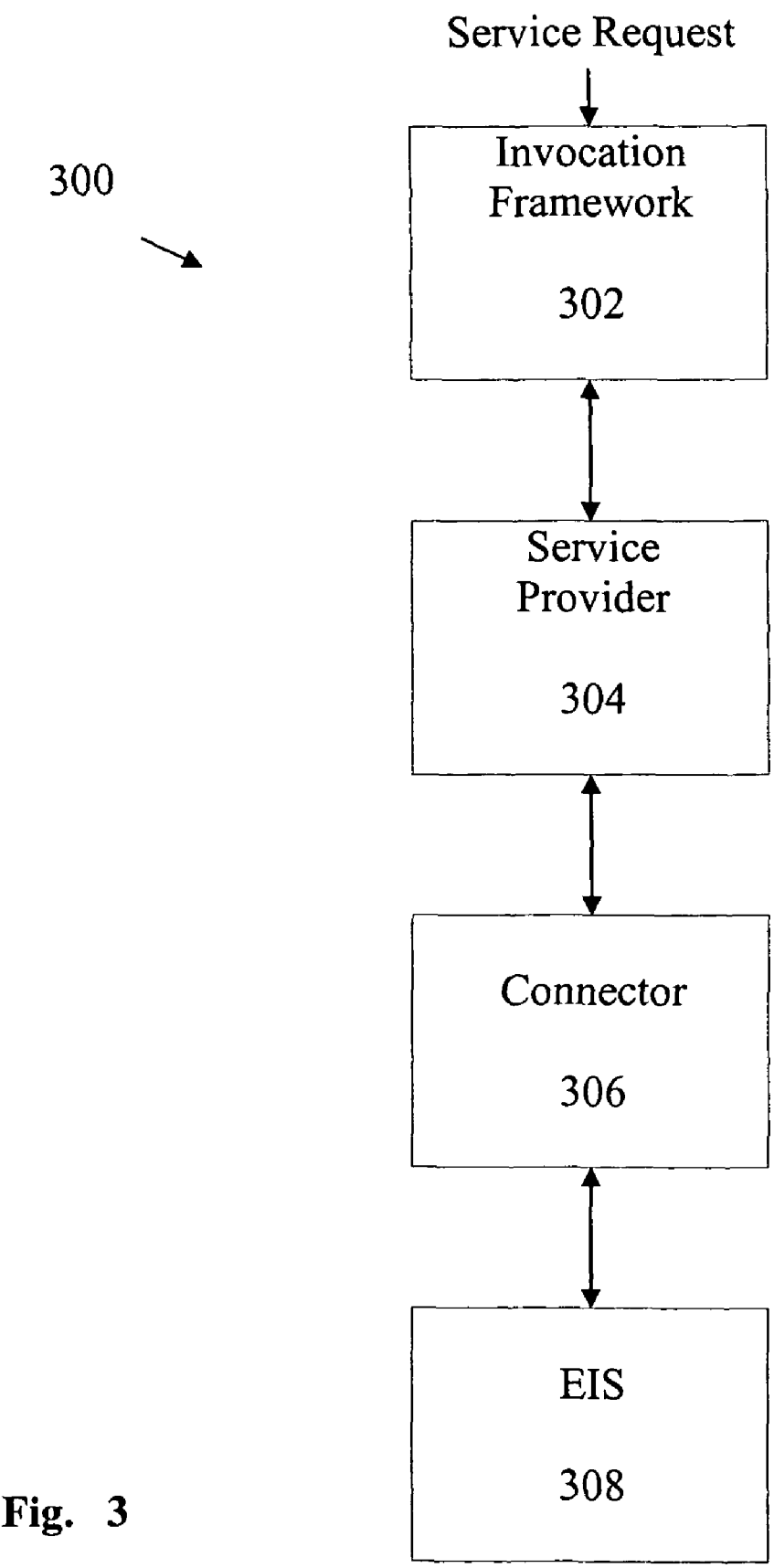
FIG. 3 illustrates a service invocation sequence according to one aspect of the present invention.
Figure 4:
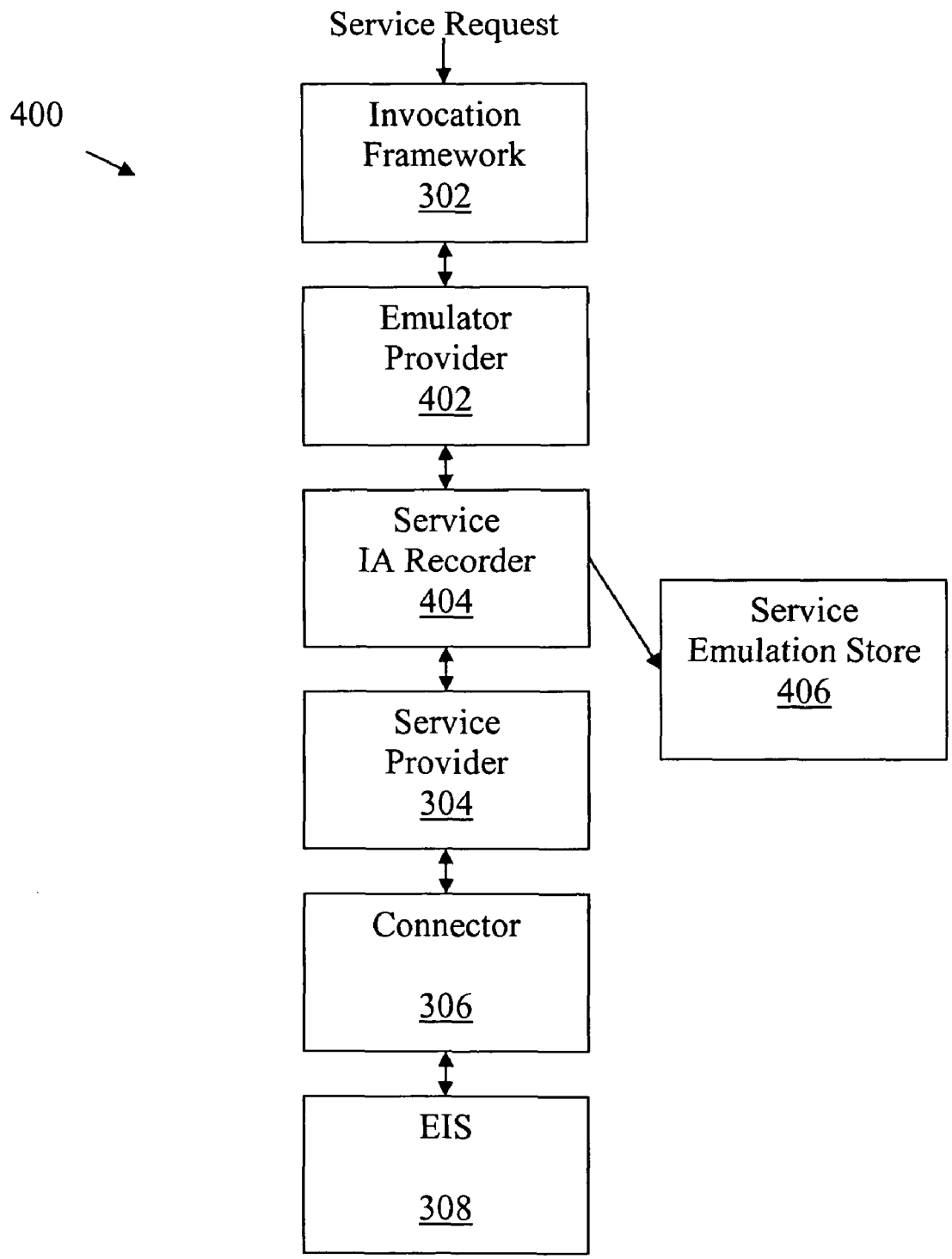
FIG. 4 illustrates a service invocation sequence according to another aspect of the present invention adapting the sequence of FIG. 3.
Figure 5:
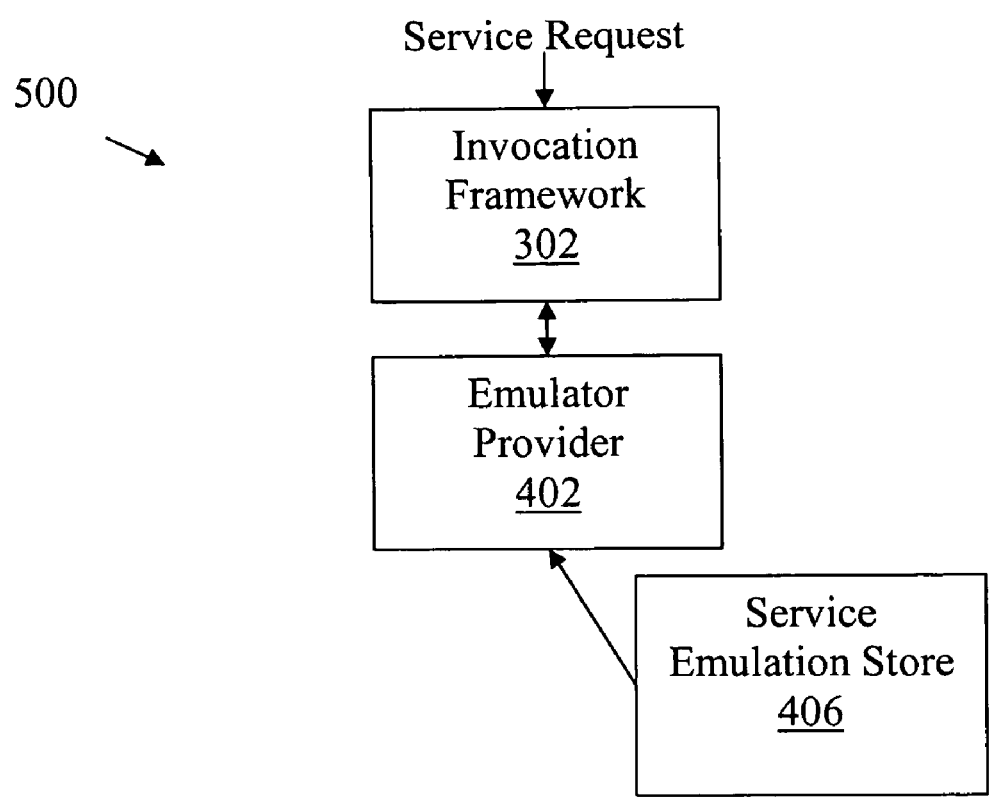
FIG. 5 illustrates a service invocation sequence according to another aspect of the present invention adapting the sequence of FIG. 3.

The computer instructions/applications stored in memory 204 and executed by CPUs 202 (thus adapting the operation of computer system 100 as described herein) are illustrated in functional block form in FIGS. 3-5. As will be appreciated by those of ordinary skill in the art, the discrimination between aspects of the applications illustrated as functional blocks is somewhat arbitrary in that the various operations attributed to a particular application as described herein may, in an alternative embodiment, be subsumed by another application. Moreover, applications residing on a single computer system 100 may be implemented on multiple systems in a multi-tiered or enterprise environment as would be apparent to those of ordinary skill in the art. Such may be implemented in accordance with one or more standards such as Java2 Enterprise Edition (J2EE).

In a service-oriented application client code does not execute EIS transactions directly. Instead, each EIS transaction is executed by invoking an operation defined by a service, which wraps the target transaction. In furtherance of goals related to interoperability, code re-use and component architecture for defining and offering e-commerce and e-business applications via the protocols of the Internet, a web services model has been developed. The functionality of a business application component offered via the Internet or web is described as an abstract service such as in an Extensible Markup language (XML) based document, in accordance with a standard. Web Services Description Language (WSDL) is one such XML-based language for abstractly describing web services. The description can then be shared with other developers and used to construct clients of the offered service. Access to the service is provided by web-based protocols such as Simple Object Access Protocol (SOAP) over Hyper Text Transfer Protocol (HTTP), Java API for XML-based Remote Procedure Calls (JAX-RPC), among others.

WSDL files capture the following information about the service:
    port type, or interface—describes service operations, and the format of input and output data;

service binding describes the address of the EIS system to which to connect; and operation bindings describe the name of the EIS function to execute, and additional system-specific information (e.g. protocol).

Service invocations are performed by a service invocation framework—for example WebSphere Invocation Framework (WSIF™) from International Business Machines Corporation. Alternative invocation frameworks include, JAX-RPC, Remote Method Invocation run over Internet Inter-ORB Protocol (RMI-IIOP) in a Common Object Request Broker Architecture (CORBA™), among others. Though the present embodiment of the invention is described in relation to WSIF, those of ordinary skill in the art will understand that other invocation frameworks may be employed in accordance with the teachings herein.

A typical service invocation may involve the following high-level steps:

client code registers the target service with WSIF-WSDL definition files are loaded;

WSIF looks up the required service provider based on the binding of the requested service;

WSIF uses the provider to create a dynamic port containing connection information;

client code uses the dynamic port to create input and output messages;

client code uses the dynamic port to create a service operation instance;

client code prepares a message containing data which will be used as input to the underlying transaction, and a message which will be used to hold the results; and client code calls the execute( ) method of the operation instance, passing the input message in as argument client code processes the message which holds the transaction results.

FIG. 3 illustrates a typical service invocation sequence 300. A service request is handled by a service invocation framework 302 (for example IBM's WSIF). The service invocation framework looks up a service provider 304 based on a service binding described for the service, for example, in a WSDL document (not shown). A service provider may comprise a software asset such as a Java bean or Enterprise Java Bean (EJB) (not shown). FIG. 3 illustrates a resource adapted EIS service provider comprising a connector 306 and EIS 308.

Service provider 304 translates the service invocation request into EIS-specific protocols and converts a data format from an EIS-specific format to a format used by the service invocation framework. EIS-specific protocols may include protocols defined by connector 306 such as an EIS-specific connector or connectors developed in accordance with a variety of standards, for example, Java Database Connectors (JDBC), Java 2 Enterprise Edition (J2EE) Connector Architecture (JCA), Java Message Service (JMS), RMI/IIOP, etc, for facilitating access to processing capabilities such as those provided by EIS 308.

In order to develop a service, a computer software developer may complete the following steps, described with reference to an exemplary J2EE web service. As described further herein below with reference to FIG. 6, this sequence of steps may be adapted in accordance with the invention to generate an emulation component to act as a proxy to the target service in a production environment:

create WSDL definitions describing a service:
create the service interface (port type);
create the service binding, which tells the provider how to access the underlying EIS and at what address;

generate deployable code for the service—for example—an EJB proxy;

deploy a service (i.e. deployable code) to a local unit-test server;

unit-test the service; and provide the service implementation (typically an Enterprise Archive (EAR) file containing all of the service artifacts) to the computer software deployer.

The deployer configures the QoS characteristics of the service (such as, security, level of transactional isolation—for example, by editing the deployment descriptor of the generated service proxy bean).

In accordance with an aspect of an embodiment of the invention, service interactions such as described above may be recorded within a production environment for replay in a development/testing environment. Replay may be useful to facilitate problem determination and iterative development.

FIG. 4 illustrates a service invocation sequence in accordance with an embodiment of the invention adapting the sequence of FIG. 3. In addition to the components of FIG. 3, there is provided two new components to the architecture described above. One component—an emulator provider 402, a type of service provider within the invocation framework, is used to imitate a service invocation while the other component, a service interaction recorder 404 is used to record the service interaction to a service emulation store 406 for later replay.

As illustrated in FIG. 4, when recording service interactions, all service invocation data flow through service interaction recorder 404. Emulator provider 402 delegates calls to the service interaction recorder 404. The service interaction recorder 404 delegates calls to the WSIF service provider 304 for the service (i.e. connected EIS service 306, 308) to be recorded. Service interaction recorder 404 records input and output data, and the time taken to complete the transaction. This information is typically serialized into the emulation store 406 such as in accordance with XML formats as understood to persons of ordinary skill in the art. Alternatively or additionally, emulation store 406 may comprise other formats such as a database table, a file, or another manner of storing, preferably persistently, service interaction data. When replaying service interactions (shown in FIG. 5 described herein below), emulator provider 402 may advantageously read service interaction data from the emulation store 406 that was populated with service interaction data during a record phase.

Emulator provider 402 is a component which imitates a service interaction, acting as a proxy to a target service or resource. Rather than executing the service target—for example an EIS transaction—this component 402 uses a store 406 to store input and output data, and performance characteristics of the transaction. Interaction with the target are relayed via the emulation component. Emulator provider 402 need not be used in conjunction with the service interaction recorder 404. It can be used in a stand-alone fashion to imitate behavior of an EIS with data that may be populated either manually, or by other means in a replay phase.

To facilitate the record and replay facilitates of emulator provider 402, in accordance with a feature of an embodiment of the invention, certain configuration parameters may be selectively set to define connection properties which control its mode of operation. Exemplary parameters comprise:

targetService—the fully qualified name of the service to be recorded. The service may be a Web service or enterprise service with various bindings, for example, Java, EJB, SOAP, CICSECI, etc.;

recordMode—Boolean property which indicates whether emulator provider will record the interaction with the target service using service interaction recorder 404;

emulateMode—Boolean property which indicates whether emulator provider 402 will emulate a service interaction, or simply invoke the equivalent operation on the target service; and address—the location of service emulation store 406.

If the emulateMode property is set to 'false', emulator provide 402 acts as a wrapper, or decorator, to the target service, delegating calls to service interaction recorder 404, that in turn uses the targetService property and WSIF to execute the target service. If the recordMode property is set to "true", service interaction recorder 404 populates service emulation store 406.

If the emulateMode is set to 'true', as illustrated with reference to FIG. 5, emulator provider 402 executes the interaction against emulation store 406 via an emulator-specific binding (not shown). If both emulateMode and recordMode are set to 'false'—emulator provider 402 simply passes the service invocation request through to the target service.

Service interaction recorder 404 operates at the invocation framework (e.g. WSIF) level. FIG. 5 shows the relationship between (WSIF) invocation framework 302, emulator provider 402, and service interaction recorder 404. Service interaction recorder 404 acts as an intermediary between the invocation framework 302 and the target service 304. It intercepts input and result messages, and serializes these into emulation stores 406 so that they can be replayed at a later time. Service interaction recorder also keeps track of how long a given interaction took to complete, and serializes this information into the emulation store 406 as well.

Implementation of the emulation facility includes a corresponding WSIF service provider (i.e. emulator provider 402). Viewed from the perspective of the invocation framework, emulator provider 402 behaves as any other service provider. All complexities connected with recording and replaying service interactions are hidden in the implementation of emulator provider 402.

Figure 6:
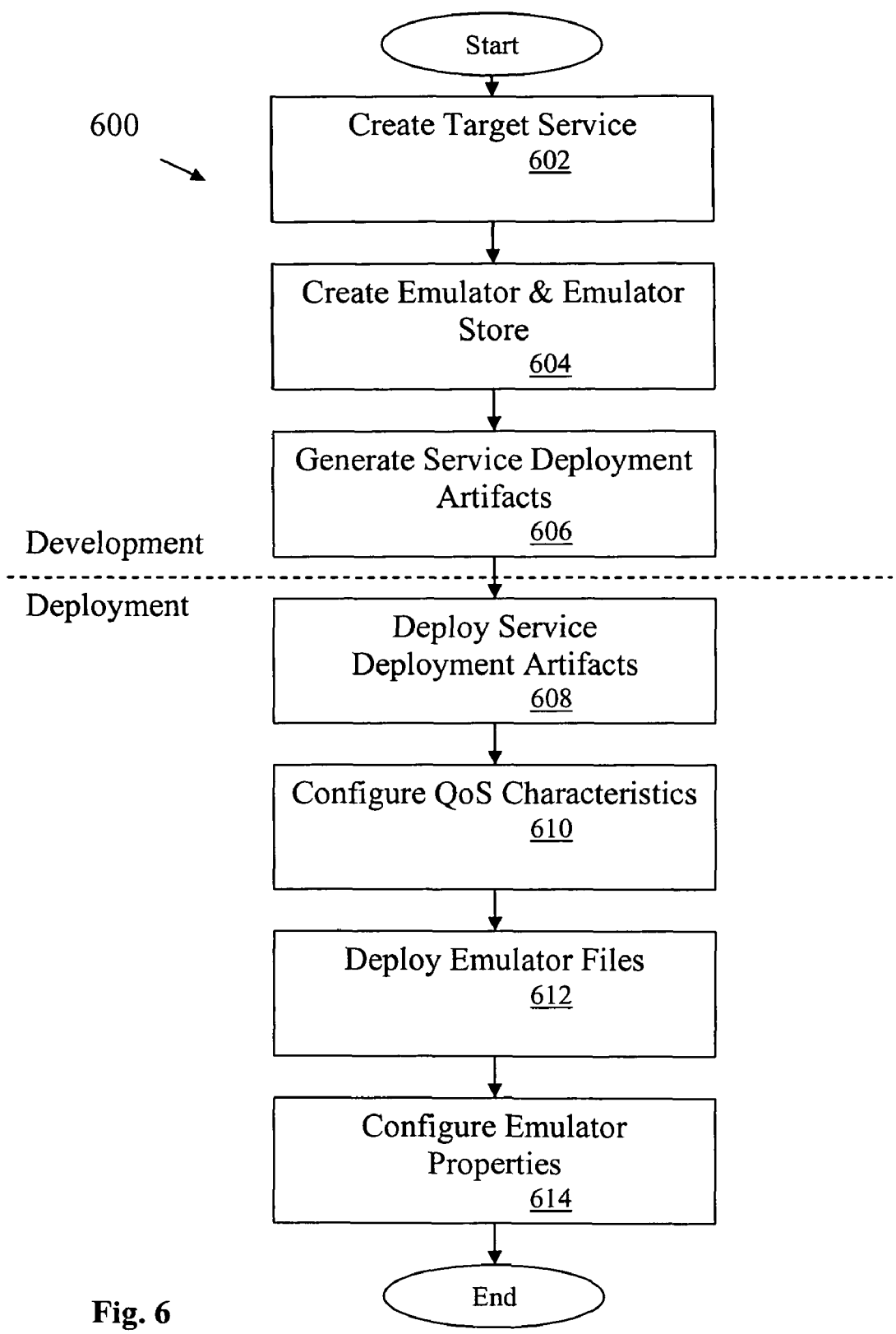
FIGS. 6-8 illustrate flow charts of operations in accordance with aspects of an embodiment of the invention.

With reference to FIG. 6 which is a flow chart of operations 600 in accordance with an aspect of an embodiment of the invention, there is shown steps for a developer and deployer that may be performed preparatory to the recording of a target service. FIG. 6 illustrates the start of such exemplary operations by a developer who at step 602 creates the target service. The target service may comprise a service WSIF provider such as provider 304 with service-specific bindings (e.g. CICSECI binding) for a connector adapted EIS (306, 308).

At step 604, an emulator service provider (e.g. 402) and store (e.g. 406) is created with specific bindings and service definition for the target service yet the portType of the service remains the same. At step 606, the developer generates deployment artifacts for the services (e.g. EJB deploy code, EAR files) which may be given to a deployer, e.g. an application server administrator. Steps 602-606 are referenced as development steps while the remaining steps of operations 600, namely steps 608-614 are deployment steps which involve deploying artifacts and configuring parameters in a production environment to be recorded for later emulation.

At deployment time, the deployer performs steps 608-614 of the present embodiment. At step 608, service deployment artifacts are deployed to an application server. At step 610, deployer configures QoS characteristics for the service and at step 612 deploys emulation stores. At step 614, connection properties for emulator provider are configured such as by editing the WSDL artifacts describing the emulator service. For example, emulation store address property is set to point to the emulation store, emulateMode is set to 'false', and recordMode is initially set to 'false'.

Figure 7:
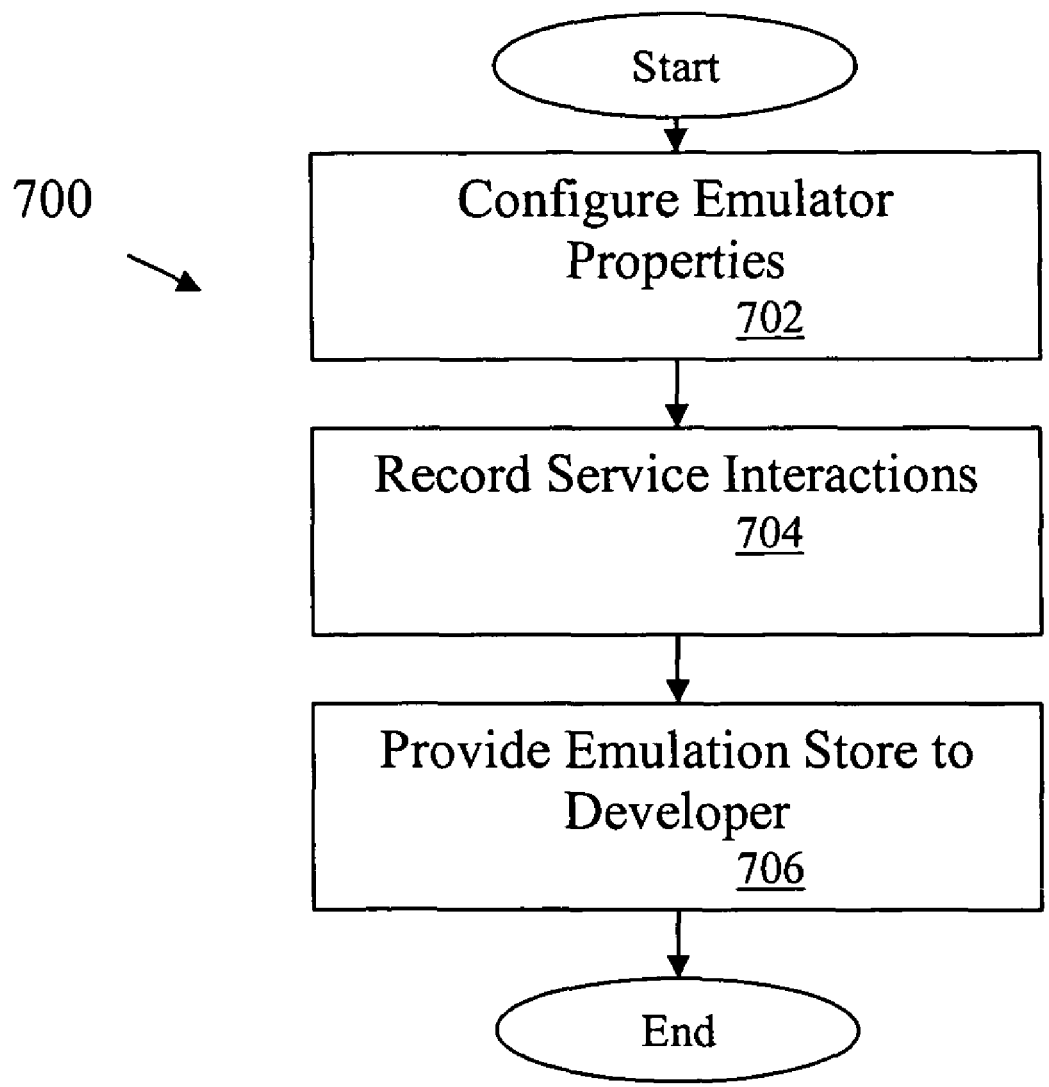

With reference to FIG. 7 which is a flow chart of operations 700 in accordance with an aspect of an embodiment of the invention, there is shown steps for a deployer or systems administrator to perform to record interactions for service invocations of a target service in a production environment. The deployer/administrator performs the following tasks to record a production snapshot of service interactions:

configure emulator connection property (e.g. by editing the WSDL (Step 702):

set property recordMode='true' to start recording service interactions;

set property recordMode='false' to stop recording service interactions;

record service interactions (Step 704); and provide emulation stores, loaded with service interaction data, to the developer (Step 706).

Figure 8:
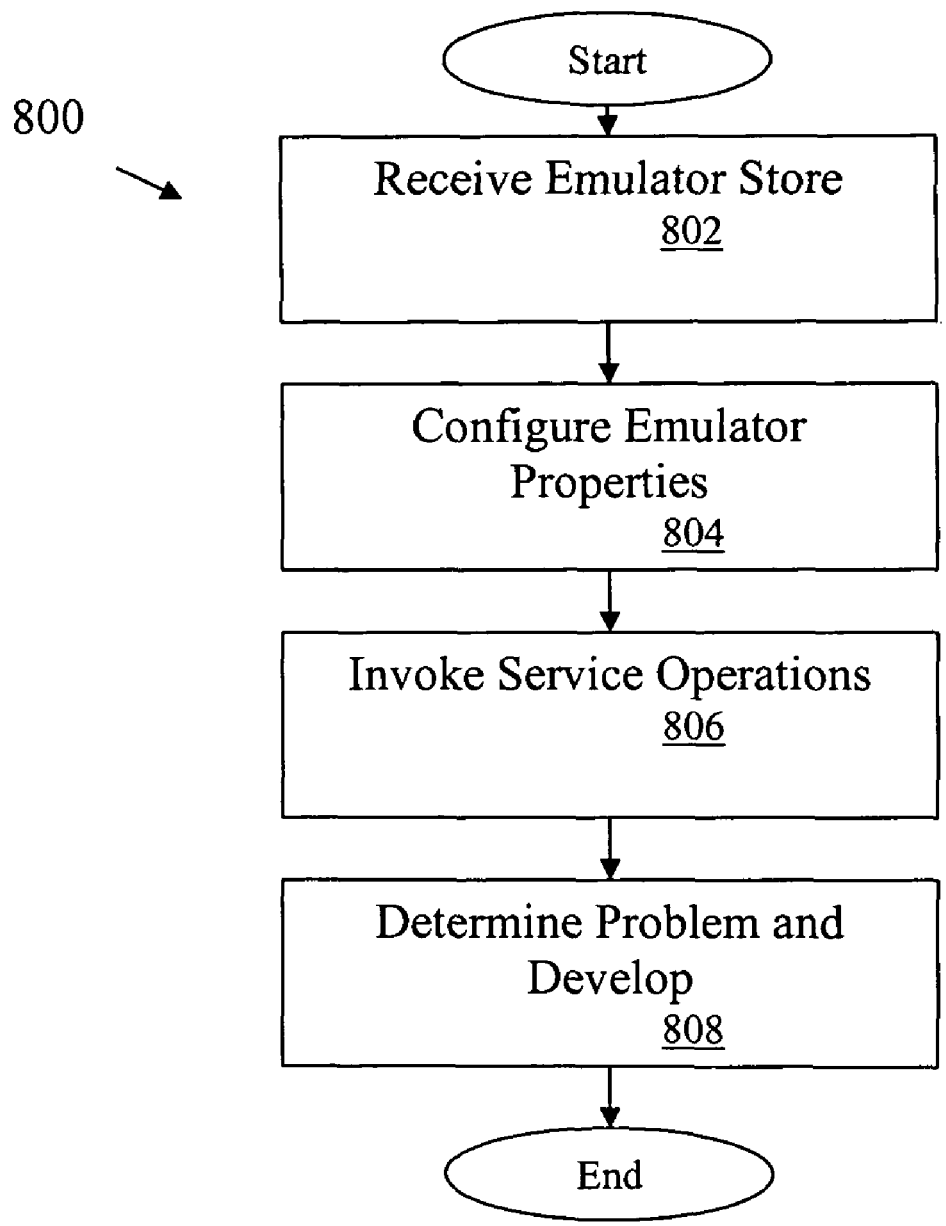

With reference to FIG. 8 which is a flow chart of operations 800 in accordance with an aspect of an embodiment of the invention, there is shown steps for a developer to use the emulation stores for problem determination and further development in a development environment. Persons skilled in the art will appreciate that such determination, development or both are typically iterative, requiring the repetition of various steps to define a solution.

With reference to FIG. 8, in order replay a service interaction recorded in the manner described above, the developer performs the following exemplary steps:

receive the emulation stores (Step 802);

configure emulator provider properties (Step 804):

set the Emulator connection property recordMode to 'false';

set the Emulator connection property emulateMode to 'true';

set the Emulator connection property—address to point to the location of the loaded emulation store;

invoke service operations (Step 806); and perform problem determination and (iterative) development (Step 808).

Persons of ordinary skill in the art understand that steps 806 and 808 may require selective repetition (not shown) to achieve desired development results. Advantageously, such may be performed without exercising the production environment.

The techniques and aspects thus described can be implemented without necessitating changes to either the service invocation framework (e.g. WSIF), or the service providers for various target services which need to be recorded. Only the party providing the service interaction recorder 404 and the emulator service provider 402 needs to perform actual development. Because service interactions are recorded at the service level, no extra work needs to be performed by the service interaction recorder to convert native EIS format data to XML as such is done by the target service provider.

Development teams building service providers for the target services do not need to have any knowledge of the service interaction recorder and emulator provider. These components can work with any standard service provided by a third party.

Although the above description relates to specific embodiments as presently contemplated by the inventors, it is understood that the invention in its broad aspect includes mechanical and functional equivalents of the elements described herein.

What is claimed is:

1. A method of emulating service interaction, the method comprising:
   providing a service invocation framework for receiving a service request and for invoking a target service from a target service provider based on the received service request;
   deploying an emulator between the service invocation framework and the target service provider, the emulator acting as a proxy of the target service provider;
   recording service interaction data into an emulation store when the emulator is in a recording mode;
   emulating the service interaction by executing the recorded service interaction data in the emulation store when the emulator is in an emulating mode; and
   passing a service invocation request to the target service provider without recording if the emulator is not in the recording mode or the emulating mode.

2. The method as claimed in claim 1, wherein emulating the interaction is repeated a plurality of times using the recorded interaction data.

3. The method as claimed in claim 1, further comprising evaluating a software component used for the service interaction and repeating the evaluation a plurality of times using the recorded interaction data.

4. The method as claimed in claim 3, wherein evaluating the software component comprises at least one of problem determination and software development.

5. The method as claimed in claim 3, comprising selectively repeating at least one of emulating the interaction and evaluating the software component to iteratively develop the software component.

6. The method as claimed in claim 1, further comprising replaying the recorded interaction data to emulate the interaction in a development and testing environment.

7. The method as claimed in claim 1 wherein the interaction data comprises quality of service (QoS) characteristics data.

8. A computer program product for emulating service interaction, the computer program product comprising:
   a computer readable storage medium having computer readable program code embodied therein, the computer readable program code when executed by a computer causing the computer to perform:
      providing a service invocation framework for receiving a service request and for invoking a target service from a target service provider based on the received service request;
      deploying an emulator between the service invocation framework and the target service provider, the emulator acting as a proxy of the target service provider;
      recording service interaction data into an emulation store when the emulator is in a recording mode;
      emulating the service interaction by executing the recorded service interaction data in the emulation store when the emulator is in an emulating mode; and
      passing a service invocation request to the target service provider without recording if the emulator is not in the recording mode or the emulating mode.

9. The computer program product as claimed in claim 8, wherein the emulation is repeated a plurality of times using the recorded interaction data.

10. The computer program product as claimed in claim 8, further comprising replaying the recorded interaction data to emulate the interaction in a development and testing environment.

11. The computer program product as claimed in claim 8, wherein the interaction data comprises quality of service (QoS) characteristics data.

12. A computer system for emulating service interaction, the computer system comprising:
   at least one processor configured to
      provide a service invocation framework for receiving a service request and for invoking a target service from a target service provider based on the received service request;
      deploy an emulator between the service invocation framework and the target service provider, the emulator acting as a proxy of the target service provider;
      record service interaction data into an emulation store when the emulator is in a recording mode;
      emulate the service interaction by executing the recorded service interaction data in the emulation store when the emulator is in an emulating mode; and
      pass a service invocation request to the target service provider without recording if the emulator is not in the recording mode or the emulating mode.

* * * * *